(12) United States Patent
Jung et al.

(10) Patent No.: US 9,767,596 B2
(45) Date of Patent: Sep. 19, 2017

(54) METHOD AND APPARATUS FOR PROCESSING DEPTH IMAGE

(71) Applicant: SAMSUNG ELECTRONICS CO., LTD., Suwon-si (KR)

(72) Inventors: Seung-won Jung, Seoul (KR); Ouk Choi, Yongin-si (KR); Do-kyoon Kim, Seongnam-si (KR); Kee-chang Lee, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 383 days.

(21) Appl. No.: 14/331,357

(22) Filed: Jul. 15, 2014

(65) Prior Publication Data

US 2015/0015569 A1    Jan. 15, 2015

(30) Foreign Application Priority Data

Jul. 15, 2013   (KR) .......................... 10-2013-0083086

(51) Int. Cl.
    *G06K 9/00*    (2006.01)
    *G06T 15/00*   (2011.01)
    *G06T 3/40*    (2006.01)

(52) U.S. Cl.
    CPC .......... *G06T 15/005* (2013.01); *G06T 3/4053* (2013.01); *G06T 2207/10028* (2013.01)

(58) Field of Classification Search
    CPC ......... G06T 2207/10024; G06T 7/0075; G06T 7/0051; G06T 5/001
    USPC ....... 382/128, 131, 132, 154, 190, 260, 282; 345/419, 653
    See application file for complete search history.

(56) References Cited

U.S. PATENT DOCUMENTS

| | | | | |
|---|---|---|---|---|
| 7,995,853 | B2 * | 8/2011 | Dowski, Jr. | G02B 27/0025 356/521 |
| 8,027,533 | B2 * | 9/2011 | Li | H04N 1/00045 348/180 |
| 8,111,908 | B2 * | 2/2012 | Sim | G06K 9/00208 345/421 |

(Continued)

FOREIGN PATENT DOCUMENTS

| | | |
|---|---|---|
| KR | 10-1109695 | 1/2012 |
| KR | 10-2012-0083913 | 7/2012 |
| KR | 10-2013-0006246 | 1/2013 |

OTHER PUBLICATIONS

Min, D. et al. "Weighted Mode Filtering and Its Applications to Depth Video Enhancement and Coding" *IEEE International Conference on Acoustics, Speecha nd Signal Processing*. 2012.

(Continued)

*Primary Examiner* — Yosef Kassa
(74) *Attorney, Agent, or Firm* — Harness, Dickey & Pierce, P.L.C.

(57) ABSTRACT

A method of processing a depth image includes receiving a high-resolution color image and a low-resolution depth image corresponding to the high-resolution color image, generating a feature vector based on a depth distribution of the low-resolution depth image, selecting a filter to upsample the low-resolution depth image by classifying a generated feature vector according to a previously learnt classifier, upsampling the low-resolution depth image by using a selected filter, and outputting an upsampled high-resolution depth image.

29 Claims, 10 Drawing Sheets

(56) References Cited

U.S. PATENT DOCUMENTS

| | | | | |
|---|---|---|---|---|
| 8,111,937 B2* | 2/2012 | Dowski, Jr. | ........ | G02B 27/0025 |
| | | | | 382/255 |
| 8,218,963 B2* | 7/2012 | Adelsberger | ........... | G03B 15/03 |
| | | | | 362/16 |
| 8,355,565 B1* | 1/2013 | Yang | ..................... | G06T 7/0075 |
| | | | | 382/154 |
| 8,401,257 B2* | 3/2013 | Izatt | ....................... | A61B 3/102 |
| | | | | 382/128 |
| 8,519,319 B2* | 8/2013 | Toda | ..................... | H04N 9/045 |
| | | | | 250/208.1 |
| 8,619,082 B1* | 12/2013 | Ciurea | ............... | H04N 13/0242 |
| | | | | 345/427 |
| 8,643,701 B2* | 2/2014 | Nguyen | ............... | H04N 13/025 |
| | | | | 348/47 |
| 2012/0293627 A1 | 11/2012 | Ishii | | |
| 2013/0038686 A1 | 2/2013 | Chen et al. | | |

OTHER PUBLICATIONS

Simonyan, K. et al. "Fast Video Super-Resolution Via Classification," *15th IEEE International Conference on Image Processing.* 2008.

Extended European Search Report dated Mar. 25, 2015 for corresponding European Application No. 14176925.7.

Dongbo Min et al., "Depth Video Enhancement Based on Weighted Mode Filtering" IEEE Transactions on Image Processing, vol. 21, No. 3, Mar. 2012, pp. 1176-1190.

\* cited by examiner

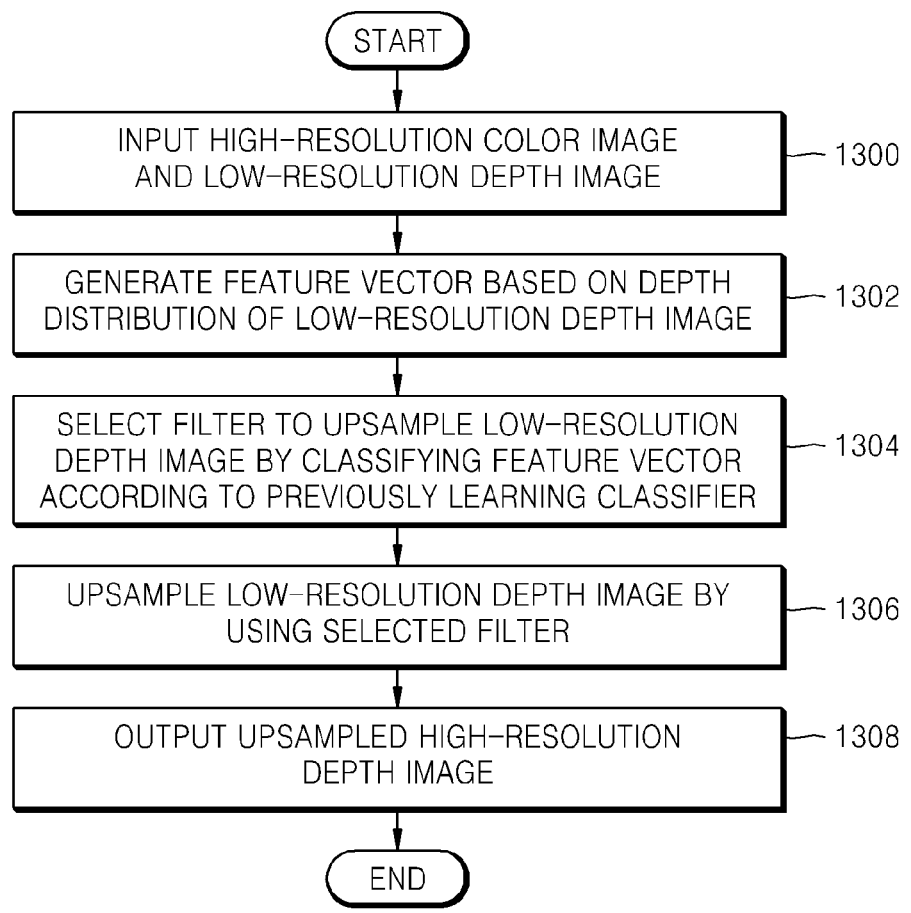

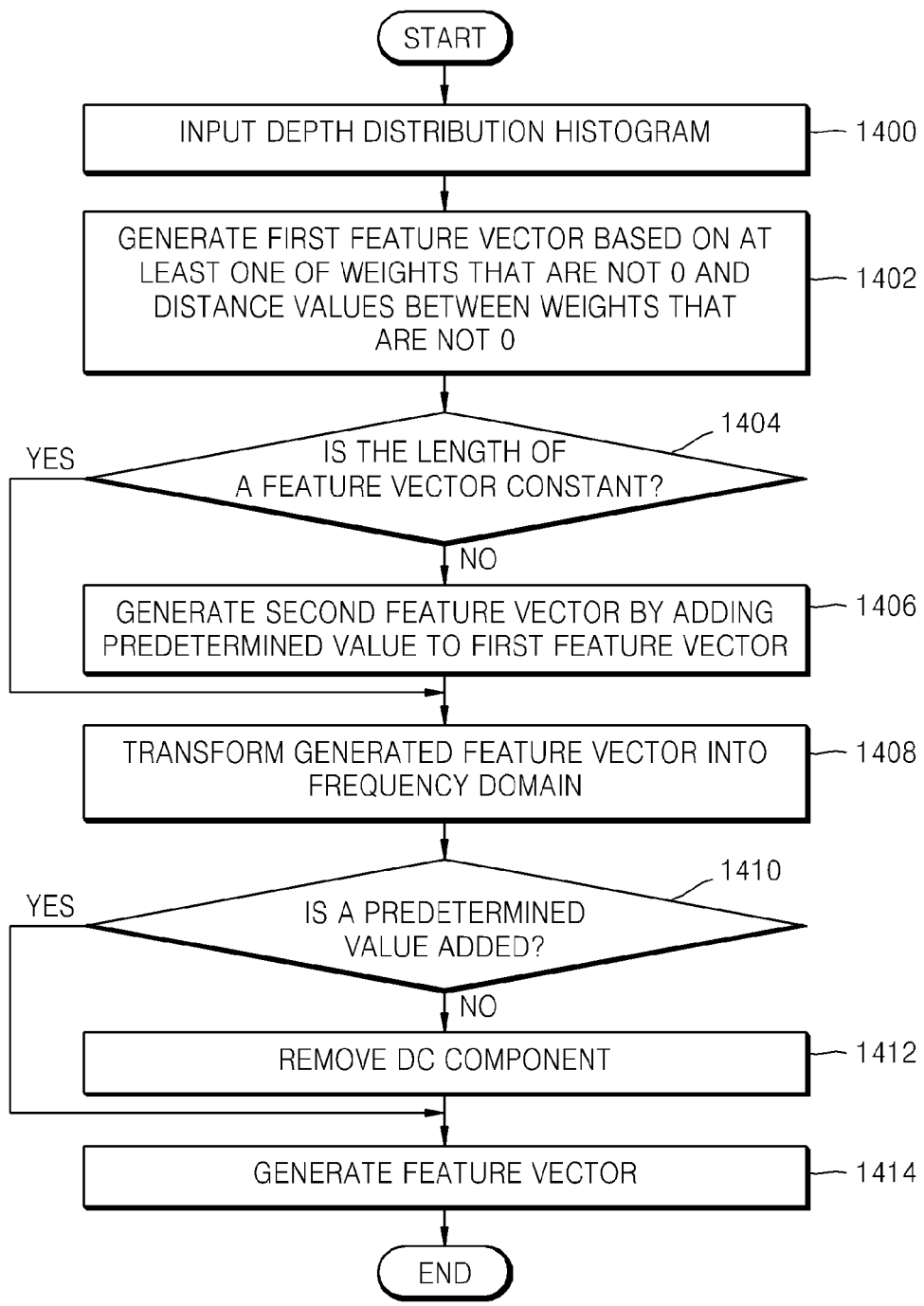

METHOD AND APPARATUS FOR PROCESSING DEPTH IMAGE

CROSS-REFERENCE TO RELATED APPLICATIONS

This application claims the benefit of Korean Patent Application No. 10-2013-0083086, filed on Jul. 15, 2013, in the Korean Intellectual Property Office, the disclosure of which is incorporated herein in its entirety by reference.

BACKGROUND

1. Field

One or more embodiments of the present disclosure relate to methods and apparatuses for processing a depth image.

2. Description of the Related Art

Recently, a 3D camera and a light detection and ranging (LIDAR) technology for capturing distance information of an object have been under development. In this regard, in a time of flight (TOF) method of measuring a turnaround time of light, a distance between a capturing apparatus and an object whose image is to be captured (hereinafter, referred to as a depth image (depth)) is measured.

According to the TOF method, light of a particular wavelength, for example, a near infrared ray of 850 nm, is projected onto an object by using an light-emitting diode (LED) or laser diode (LD) and the light having the same wavelength reflected from the object is measured or captured by a photodiode or a camera and undergoes processing for extracting a depth image. A variety of TOF methods about light processing, that is, a series of operations such as light source projection, reflection from an object, optical modulation, capturing, and processing, have been introduced.

However, a depth image obtained by a TOF camera or a structured-light camera generally has a low spatial resolution compared to a color image. A variety of 3D applications including 3D image rendering, for example, view synthesis, depth image based rendering, etc, require a color image and a depth image that have the same spatial resolution. Thus, a technology to increase the resolution of a depth image, that is, to obtain a depth image of super resolution, is needed.

SUMMARY

Provided are methods and apparatuses for processing a depth image to generate a high-resolution depth image by using an optimal upsampling filter by selecting an upsampling filter corresponding to a depth distribution characteristic of a low-resolution depth image by using a previously learnt classifier and performing upsampling by using a selected upsampling filter.

Additional aspects will be set forth in part in the description which follows and, in part, will be apparent from the description, or may be learnt by practice of the presented embodiments.

According to an aspect of the present inventive concept, a method of processing a depth image includes receiving a high-resolution color image and a low-resolution depth image corresponding to the high-resolution color image, generating a feature vector based on a depth distribution of the low-resolution depth image, selecting a filter to upsample the low-resolution depth image by classifying a generated feature vector according to a previously learnt classifier, upsampling the low-resolution depth image by using a selected filter, and outputting an upsampled high-resolution depth image.

According to another aspect of the present inventive concept, an apparatus for processing a depth image includes a feature vector generation unit for receiving a high-resolution color image and a low-resolution depth image corresponding to the high-resolution color image and generating a feature vector based on a depth distribution of the low-resolution depth image, a classification unit for classifying a generated feature vector according to a previously learnt classifier, a filter selection unit for selecting a filter to upsample the low-resolution depth image, and an upsampling unit for upsampling the low-resolution depth image by using the selected filter and outputting an upsampled high-resolution depth image.

According to another aspect of the present inventive concept, there is provided a non-transitory computer readable recording medium having recorded thereon a program for executing the above method.

According to another aspect of the present inventive concept, a method of processing a depth image includes receiving a high-resolution color image and a low-resolution depth image that corresponds to the high-resolution color image, selecting a filter to upsample the low-resolution depth image based on a depth distribution of the low-resolution depth image and upsampling, by way of a processor, the low-resolution depth image using the selected filter.

According to another aspect of the present inventive concept, an apparatus for processing a depth image includes a hardware-based processor to execute one or more processor-executable units, a depth distribution determination unit to receive a high-resolution color image and a low-resolution depth image that corresponds to the high-resolution color image and to generate a depth distribution of each portion of a plurality of portions of the low-resolution depth image, and a filter selection unit to select a different filter to upsample each portion of the low-resolution depth image based on the depth distribution of each portion of the plurality of portions of the low-resolution depth image determined by the depth distribution determination unit.

BRIEF DESCRIPTION OF THE DRAWINGS

These and/or other aspects will become apparent and more readily appreciated from the following description of the embodiments, taken in conjunction with the accompanying drawings in which:

FIG. 13 is a flowchart for explaining a method of processing a depth image according to another embodiment of the present inventive concept; and FIG. 14 is a flowchart for explaining a method of processing a depth image according to another embodiment of the present inventive concept.

DETAILED DESCRIPTION

Figure 1:
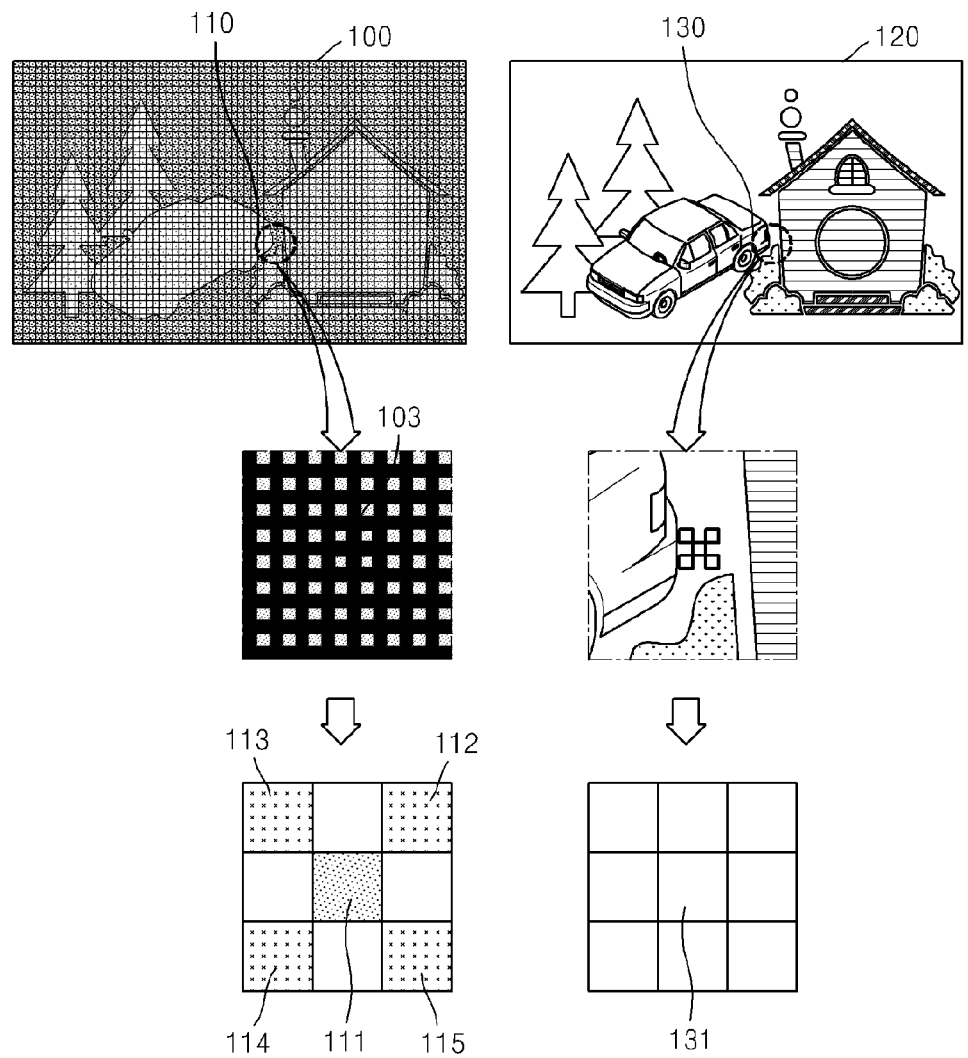
FIG. 1 illustrates determination of a hole pixel that is an upsampling target by using a low-resolution depth image and a high-resolution color image, according to an embodiment of the present inventive concept.

The present inventive concept is described in detail with reference to the accompanying drawings. However, the present inventive concept is not limited thereto and it will be understood that various changes in form and details may be made therein without departing from the spirit and scope of the following claims. That is, descriptions of particular structures or functions may be presented merely for explaining exemplary embodiments of the present inventive concept.

Terms such as "first" and "second" are used herein merely to describe a variety of constituent elements, but the constituent elements are not limited by the terms. These terms are used only for the purpose of distinguishing one constituent element from another constituent element.

The terms used in the present specification are used for explaining a specific exemplary embodiment, and not for limiting the present inventive concept. Thus, the singular form in the present specification also includes the plural form unless clearly specified otherwise in context. Also, terms such as "include" or "comprise" may be construed to denote a certain characteristic, number, step, operation, constituent element, or a combination thereof, but may not be construed to exclude the existence of or a possibility of addition of one or more other characteristics, numbers, steps, operations, constituent elements, or combinations thereof.

Unless defined otherwise, all terms used herein including technical or scientific terms have the same meanings as those generally understood by those of ordinary skill in the art to which the present inventive concept may pertain. Terms as defined in generally used dictionaries are construed to have meanings matching the meanings in the context of the related technology, unless clearly defined otherwise, are not construed to be ideally or excessively formal.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

First, high-resolution conversion of a depth image and selection of a filter for the high-resolution conversion will be briefly described with reference to FIGS. 1 to 5. Referring to FIG. 1, examples of a depth image 100 having a low resolution and a color image 120 having a high resolution are illustrated. A resolution of the depth image 100 corresponds to ½ of a resolution of the color image 120, that is, a resolution is ½ in a vertical direction and ½ in a horizontal direction. Assuming that the resolution of a depth image is less than the resolution of a color image, a magnifying power in the resolution between the two images may be a certain value. FIG. 1 illustrates a result of expanding the depth image 100 having a low resolution to fit the high resolution of the color image 120. As illustrated in FIG. 1, when a particular area 110 of the depth image 100 and the same area 130 of the color image 120 are compared to each other, depth values of many hole pixels (103 of a black portion in FIG. 1) do not exist due to a difference in resolution, that is due to the lower resolution of the depth image. In the present embodiment, pixels lacking a depth value are defined as hole pixels. Thus, high-resolution conversion of the depth image 100 is a process of calculating a depth value for each hole pixel.

Referring to FIG. 1 again, a hole pixel 111 may be filled by calculating a depth value of the hole pixel 111 from depth values of neighboring pixels 112 to 115 that are not hole pixels and that surround the hole pixel 111. The calculation may be performed via a variety of methods and a characteristic of filling the hole pixel 111 varies with the resultant depth value according to each method. For example, the hole pixel may be smoothly filled when filling is performed by using an average value of the depth values of the neighboring pixels 112 to 115. In this case, however, a depth discontinuity may occur. Obtaining a depth value of a hole pixel by using depth values of neighboring pixels may be referred to as filtering. For example, a variety of filters such as a Gaussian filter, a weighted mean filter, a weighted median filter, a minimum filter, a maximum filter, etc. may be used.

Since the color image 120 has a relatively high resolution, a filter may be designed by using a pixel value of the high-resolution color image 120. For example, for a joint bilateral filter (JBF), a relatively large weight is given to a depth pixel close to a hole pixel and a relatively large weight is given to the hole pixel when a color value of a hole pixel and a color value of a neighboring depth pixel are more similar to each other. The hole pixel of a depth image may be filled by using the two weights altogether while generating an edge of a depth image similar to an edge of the color image. However, the JBF has problems regarding texture copying, depth-edge blur, etc. In addition to the JBF, various other filters working well in some areas do not generally work well in the entire image. Thus, a filter needs to be selectively applied to an image area.

Figure 2:
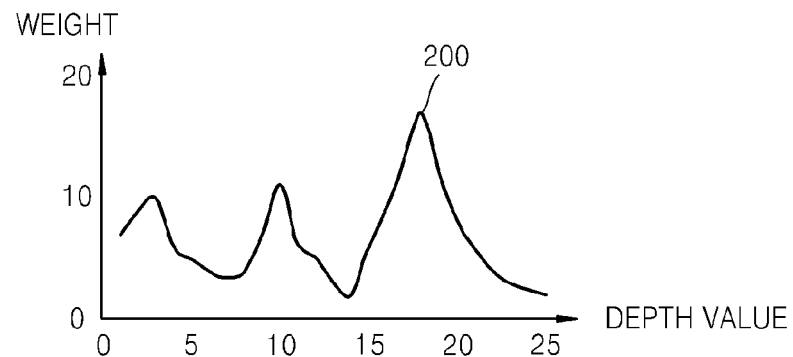
FIGS. 2, 3, 4, and 5 are graphs showing examples of a distribution characteristic of a depth image.

Referring to FIGS. 2 to 5, a distribution characteristic of a depth image and the selection of a filter according thereto are described below. Referring to FIG. 2, the weight may be calculated by using a difference in distance between a hole pixel and a neighboring pixel, a difference between the color of a hole pixel and the color of a neighboring pixel, etc. In doing so, normalization may be performed so that a sum of the weights is 1. A normalized depth distribution may be defined by a histogram or a probability distribution function. The value of a hole pixel may be determined from a depth weight distribution. As illustrated in FIG. 2, for a weighted mode filter (WMF), a hole pixel is filled according to a depth value having the maximum value in the distribution (reference numeral 200 in FIG. 2).

Figure 3:
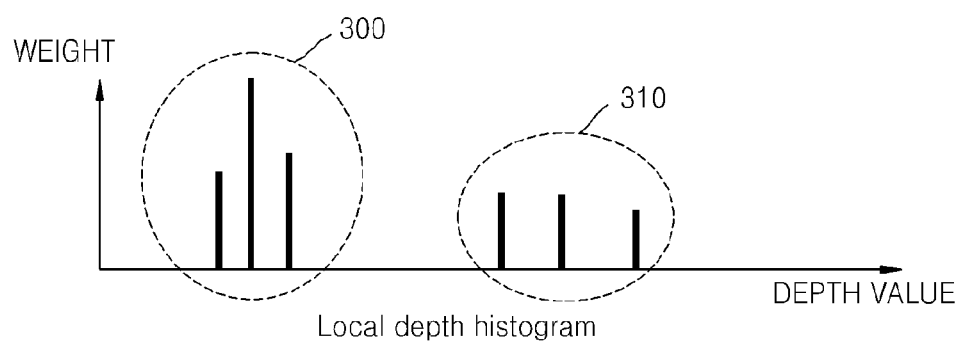

FIG. 3 illustrates an example having a bimodal distribution characteristic. Referring to FIG. 3, when a hole pixel is located at a boundary of an object, neighboring depth values are divided into two layers, that is, a foreground and a background. In this case, the foreground and the background may be clearly divided and high-resolution conversion may be performed by assigning the depth values of hole pixels to one of the two layers.

Figure 4:
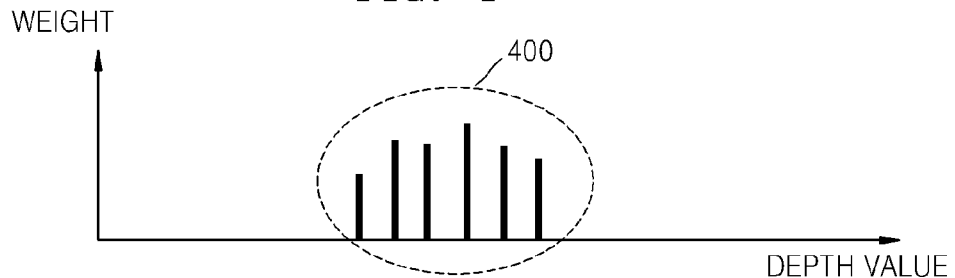

FIG. 4 illustrates an example of a unimodal distribution characteristic. Referring to FIG. 4, a depth value distribution characteristic like the unimodal distribution characteristic appears around a soft object area. In this case, a smoothing filter such as a mean filter may be effective.

Figure 5:
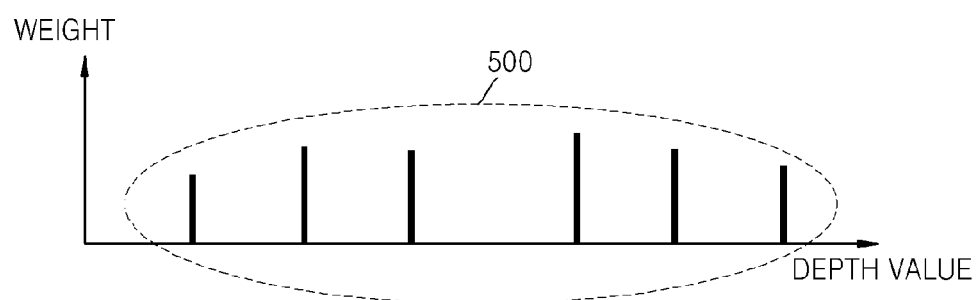

FIG. 5 illustrates an example of a depth distribution characteristic that is sparsely distributed. Referring to FIG. 5, when noise exists in a depth value, in particular, noise of a non-linear characteristic, a depth distribution characteristic occurs. In this case, a median filter may be effectively used.

As described with reference to FIGS. 2 to 5, a type of filter that will be effective for upsampling may be different according to a difference in a distribution of a depth image. In the method and apparatus for processing a depth image according to the present embodiment, an upsampling filter according to a distribution characteristic of a depth image is learnt so that an effective upsampling filter may be selected according to a difference in the distribution characteristic of a depth image, a classifier according to a result of learning is designed and is stored in a database, an appropriate filter is selected for each hole pixel of a low-resolution depth image input to the image processing apparatus via the classifier stored in the database, and upsampling is performed for each hole pixel so that a high-resolution depth image is generated.

Figure 6:
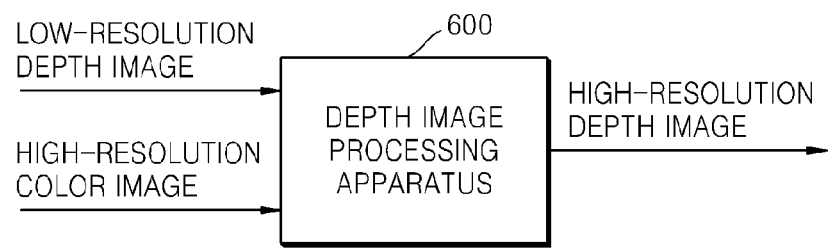
FIG. 6 is a block diagram of a depth image processing apparatus according to an embodiment of the present inventive concept.

FIG. 6 is a block diagram of a depth image processing apparatus 600 according to an embodiment of the present inventive concept. Referring to FIG. 6, the depth image processing apparatus 600 according to the present embodiment may selectively use a filter according to a distribution characteristic of a neighboring depth value based on an upsampling target pixel in a low-resolution depth image, that is, based on a hole pixel that is targeted for upsampling in the low-resolution depth image. To select a filter, an effective filtering method according to a depth value distribution is learnt from a ground-truth high-resolution depth image by using a machine-learning technique. A high-resolution depth image is generated through a method of applying a learnt result to an actual low-resolution depth image. The depth image processing apparatus 600 may be provided in a 3D camera, a 3D TV, a 3D monitor, or a 3D cinema system. Also, a color image may be an image captured by a color image obtaining apparatus, a depth image may be an image captured by a depth sensor or a depth image obtaining apparatus, or the color image and the depth image may be images captured by the same image obtaining apparatus.

The depth image processing apparatus 600 uses a low-resolution depth image and a high-resolution color image as inputs and provides a high-resolution depth image, for which high-resolution restoration has been completed, as an output. The low-resolution depth image and the high-resolution color image have the same view point. When there is a difference in the view point between input images, pre-processing for matching the view points through image registration or image calibration should be performed. Accordingly, when there is a difference in the view point between the depth image and the color image, a preprocessing module may be further provided inside or before the depth image processing apparatus 600. It is sufficient that an input depth image has a certain resolution that is lower than the resolution of an input color image. The resolution is not limited to any particular value indicating "high" or "low" resolution that are implied by a term such as "low resolution" or "high resolution." The detailed structure of the depth image processing apparatus 600 will be described with reference to FIG. 7.

Figure 7:
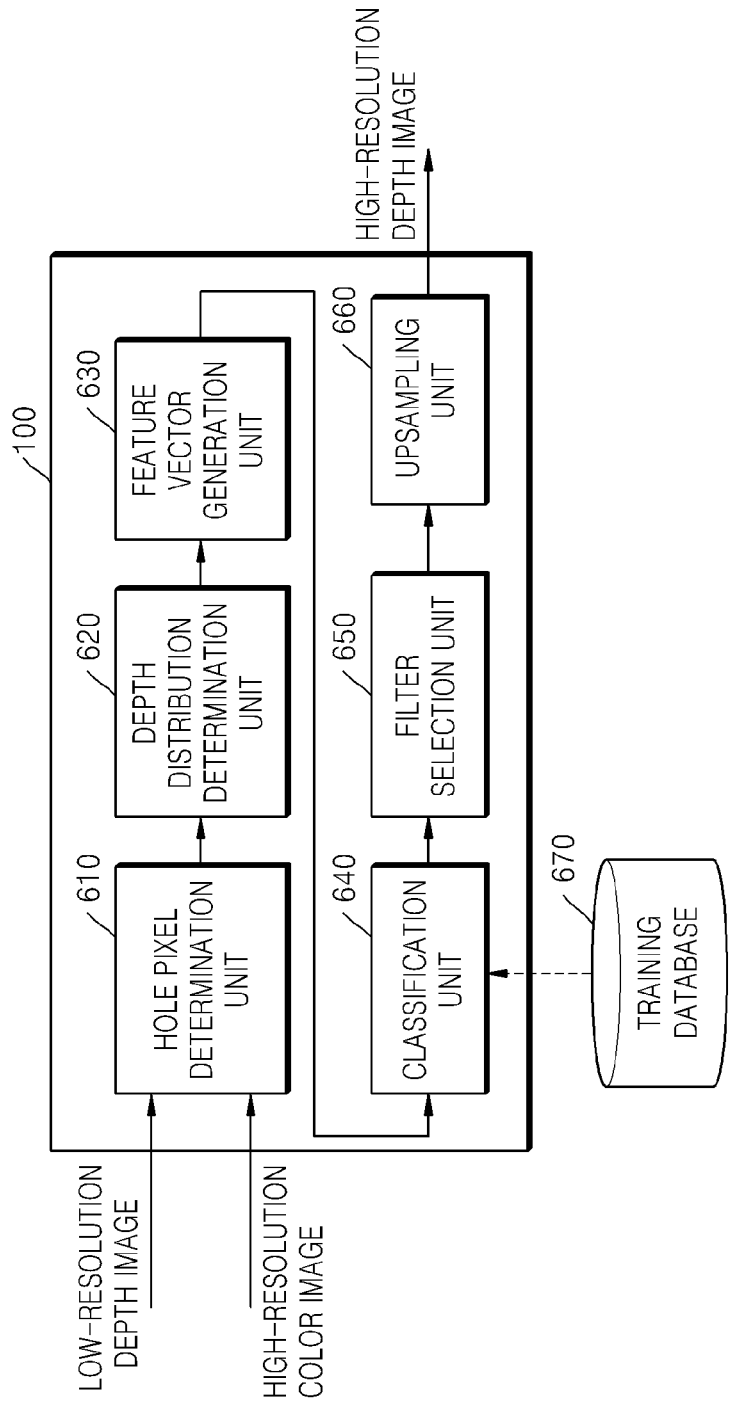
FIG. 7 is a block diagram illustrating a structure of the depth image processing apparatus of FIG. 6.

FIG. 7 is a block diagram illustrating the structure of the depth image processing apparatus 600 of FIG. 6. Referring to FIG. 7, the depth image processing apparatus 600 may include, for example, a hole pixel determination unit 610, a depth distribution determination unit 620, a feature vector generation unit 630, a classification unit 640, a filter selection unit 650, and an upsampling unit 660.

The hole pixel determination unit 610 determines a hole pixel that is an upsampling target pixel in a low-resolution depth image by using an input high-resolution color image. In an embodiment, since the resolution of a color image is higher than that of a depth image, when the high-resolution color image and the low-resolution depth image are compared with each other, pixels having no depth values may exist in the low-resolution depth image, as illustrated in FIG. 1. The depth image processing apparatus 600 according to the present embodiment generates a depth image of a high resolution by filling-in or interpolating depth values of the pixels having no depth value.

The depth distribution determination unit 620 determines a depth distribution with respect to each of the hole pixels determined by the hole pixel determination unit 610. The depth distribution determination unit 620 determines a depth distribution based on depth values and weights of neighboring pixels of the hole pixel. As illustrated in FIGS. 2 to 5, a distribution or a histogram indicating weights assigned to the depth values of the neighboring pixels is determined with respect to the hole pixel. The weight may be assigned by using a distance between the hole pixel 111 and the neighboring pixels 112 to 115 and a difference in the color value between the hole pixel 111 and the neighboring pixels 112 to 115 in FIG. 1. The weight may be increased as a neighboring pixel is closer to the hole pixel 111 and may be increased as a difference in the color value between the hole pixel 111 and each of the neighboring pixels 112 to 115 decreases. In other words, since the most likely pixel to affect the hole pixel 111 is a pixel located close to the hole pixel 111 and having a color similar to the hole pixel 111, the weight is given as described above. Although four pixels are illustrated as the neighboring pixels 112 to 115 of the hole pixel 111, the number of pixels included in the particular area 110 may be increased or decreased as needed.

The feature vector generation unit 630 generates a feature vector based on the depth distribution determined by the depth distribution determination unit 620. Although an upsampling filter for a particular hole pixel may be determined based on the overall characteristics of a depth distribution, it is more effective to extract meaningful information from the depth distribution. Accordingly, in the present embodiment, a feature vector is generated based on the depth distribution.

Figure 9:
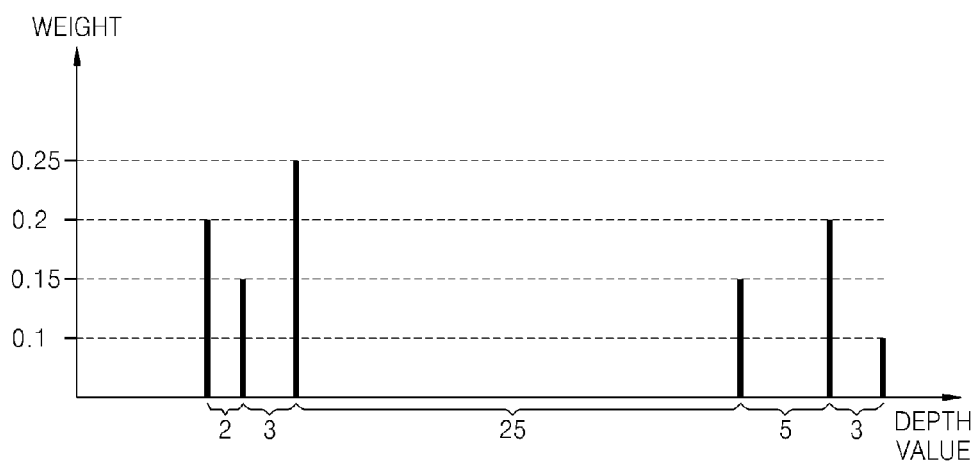
FIGS. 9, 10A, 10B, 10C, 10D, 11A, 11B, and 11C illustrate generation of a feature vector by using a distribution characteristic of a depth image.

The generation of a feature vector will be described based on FIGS. 9 to 11. Referring to FIG. 9, a depth distribution of a particular hole pixel of a low-resolution depth image is illustrated. The depth distribution is expressed by weights of the depth values of the neighboring pixels of the hole pixel. As described above, not only the depth distribution value but also a variable pattern of a depth distribution includes meaningful information. The sum of weights may be normalized to 1.

Figure 10A:
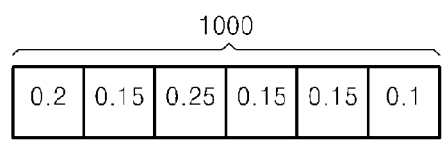

Referring to FIGS. 9 and 10A, six bins whose weights are not 0, that is, non-empty bins, are illustrated. A feature vector is generated by using the non-empty bins. A feature vector 1000 generated by using the non-empty bins is a feature vector whose length including weights of 0.2, 0.15, 0.25, 0.15, 0.15, and 0.1 is 6.

Referring to FIGS. 9 and 10O, a feature vector is generated by using a distance between the non-empty bins. A feature vector 1020 generated by using a distance between the non-empty bins is a feature vector whose length including weights of 2, 3, 25, 5, and 3 is 5.

Although the use of the non-empty bins and the distance between the non-empty bins is described with reference to FIGS. 10A and 10C, the present inventive concept is not limited thereto and a weight over a predetermined critical value and a distance between the weights over a predetermined critical value may be used.

When a feature vector is generated, the length of a generated feature vector may vary according to a depth distribution. Accordingly, there is a need to fix the length of a feature vector. Also, since a classifier requires a feature vector having the same length, a method of setting the length of a feature vector to be sufficiently lengthy and then adding or padding a final constituent element value of the feature vector when an extracted feature vector has a length that is shorter than a fixed length may be used.

Figure 10B:
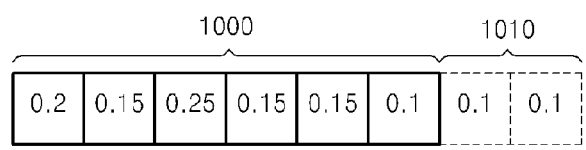
Figure 10C:
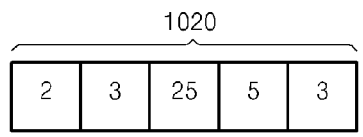
Figure 10D:
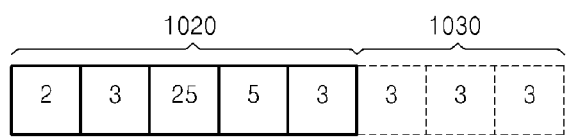

Referring to FIGS. 10A and 10C, when the lengths of feature vectors are 6 and 5, respectively, and the length of a feature vector is fixed to 8, for example, as illustrated in FIGS. 10B and 10D, the final constituent elements of the feature vectors generated based on the depth distribution, that is, 0.1 in FIG. 12A and 3 in FIG. 12B, are respectively added to the feature vectors 1000 and 1020, thereby generating the feature vectors.

Referring to FIG. 10B, two final constituent elements of 0.1 are added to the feature vector generated by using the weight that is not 0, that is, 0.2, 0.15, 0.25, 0.15, 0.15, and 0.1. Accordingly, the feature vector having the length of 8 has the weights of 0.2, 0.15, 0.25, 0.15, 0.15, 0.1, 0.1, and 0.1.

The generation of a feature vector according to another embodiment of the present inventive concept will be described below with reference to FIG. 1.

Figure 11A:
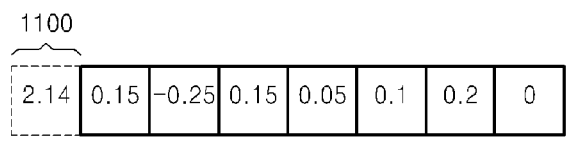
Figure 11B:
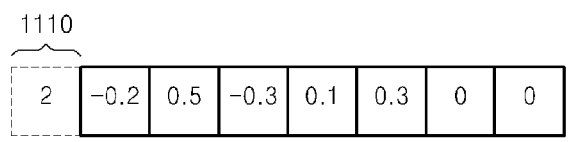
Figure 11C:
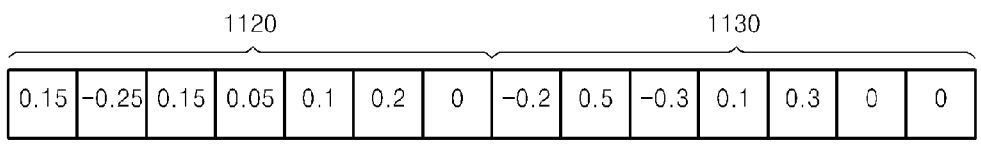

A pattern wherein a depth value changes may be more clearly interpreted in a frequency domain. The feature vectors of FIGS. 11A and 11B are generated by performing a discrete frequency conversion of feature vectors in a spatial area illustrated in FIGS. 10B and 10D to a frequency domain. For example, the feature vectors are transformed into the frequency domain by discrete cosine transform (DCT) and thus feature vectors are generated in the frequency domain. Not only the above-described DCT but also discrete sine transform or discrete Fourier transform may be used for the frequency conversion. Also, since padding is performed to maintain a particular length of a feature vector in the spatial area, a bias may exist in a low frequency component of a feature vector in a frequency domain. Accordingly, a feature vector may be generated except for a part of the low frequency component. Also, since the padding is performed to maintain a constant length of a feature vector in the spatial area, bias may exist in a low frequency component of the feature vector of a frequency area. Accordingly, a feature vector may be generated except for the part of a low frequency component. A feature vector is generated by removing a DC component 1100, that is, 2.14, as illustrated in FIG. 11A, and a DC component 1110, that is, 2, as illustrated in FIG. 11B. Also, feature vectors 1120 and 1130 may be generated as illustrated in FIG. 11C by connecting the feature vectors of FIGS. 11A ad 11B. Although the DC component 1100 is removed in the above description, small AC components, that is, AC components in which the AC component is under a predetermined value, may be removed in addition to the DC component. For example, when a feature vector that is frequency-transformed includes one DC component and nine AC components of AC1 (the lowest frequency AC), . . . , AC9 (the highest frequency AC), DC, DC+AC1, DC+AC1+AC2, etc. may be removed.

Although in the present embodiment the generation of a feature vector is described with reference to FIGS. 9 to 11, the method of generating a feature vector is not limited thereto and a variety of methods may be used to show a characteristic of a depth distribution. In the present embodiment, a weight that is not 0 and/or a distance between depth values having weights that are not 0 are used in a histogram indicating a depth distribution of a low-resolution depth image.

The classification unit 640 classifies the feature vectors generated by the feature vector generation unit 630 according to a previously learned classifier. The classification unit 640 classifies input feature vectors by using a classifier stored in a training database 670. The training database 670 need not be included directly in the depth image processing apparatus 600 and may store feature vector sets of each class generated by using a high-resolution color image and a high-resolution depth image. The classifier 640 classifies the input feature vectors by using only a classifier that learns the feature vector sets of each class stored in the training database 670. The classifier is a standard for selecting a filter appropriate for an input feature vector, and the standard may be learnt through machine learning. The classifier learning is described with reference to FIG. 8.

Figure 8:
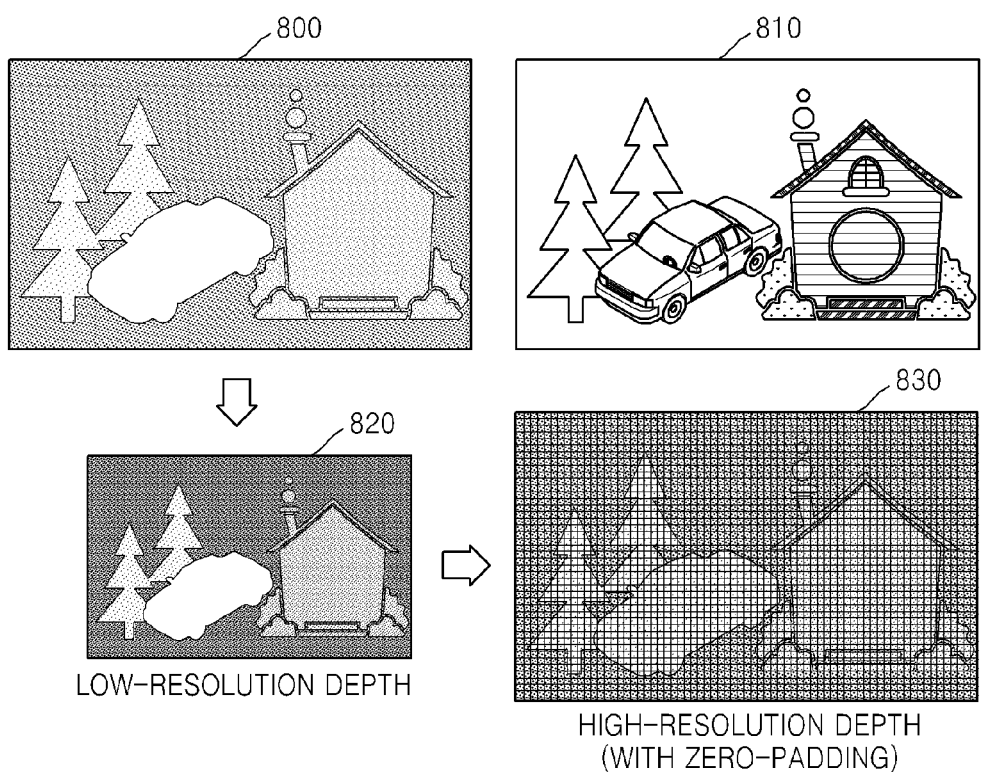
FIG. 8 illustrates a training database based on a sample high-resolution depth image and a high-resolution color image.

FIG. 8 illustrates the generation of a training database by using a sample high-resolution depth image and a high-resolution color image. Referring to FIG. 8, a training database is generated by using a sample or ground-truth high-resolution depth image 800 and a high-resolution color image 810. A pair of high-resolution color-depth images 800 and 810 are used for supervised classification. The high-resolution depth image 800 is reduced at a predetermined magnifying power and thus a low-resolution depth image 820 is generated and then expanded to a high-resolution depth image 830. In other words, when the resolution of a low-resolution depth image is expanded, a high-resolution depth image is generated through zero padding. The most effective filter may be found by applying a variety of filters to the hole pixel of the high-resolution depth image 830 that is generated and comparing a result of the application with a depth value of the high-resolution depth image 800. Optimal filters are determined for all hole pixels and a determination result is stored into a database.

A filtering method that is determined to be the most effective one of a plurality of filtering methods may be selected for each hole pixel. Filters to be considered are defined as f1, f2, . . . , fN. After applying a variety of filters to the hole pixels, a filter that shows the closest depth value to the pixel value of the high-resolution depth image 800 is selected. When the filters show the same depth value, the generation of a training database may be omitted. A training database may be formed for each filter or class by using a depth distribution of a hole pixel that selects the filter. To this end, as illustrated in FIG. 1, the whole depth distribution or a depth distribution histogram may be used or a feature vector obtained by transforming the whole depth distribution or a depth distribution histogram may be used therefore. It is more effective to design a classifier to extract meaningful information from a depth distribution rather than using the whole depth distribution. When a training database is generated, a feature vector is extracted from the depth distribution of a depth image. The extraction of a feature vector is described with reference to FIGS. 9 to 11.

Figure 12:
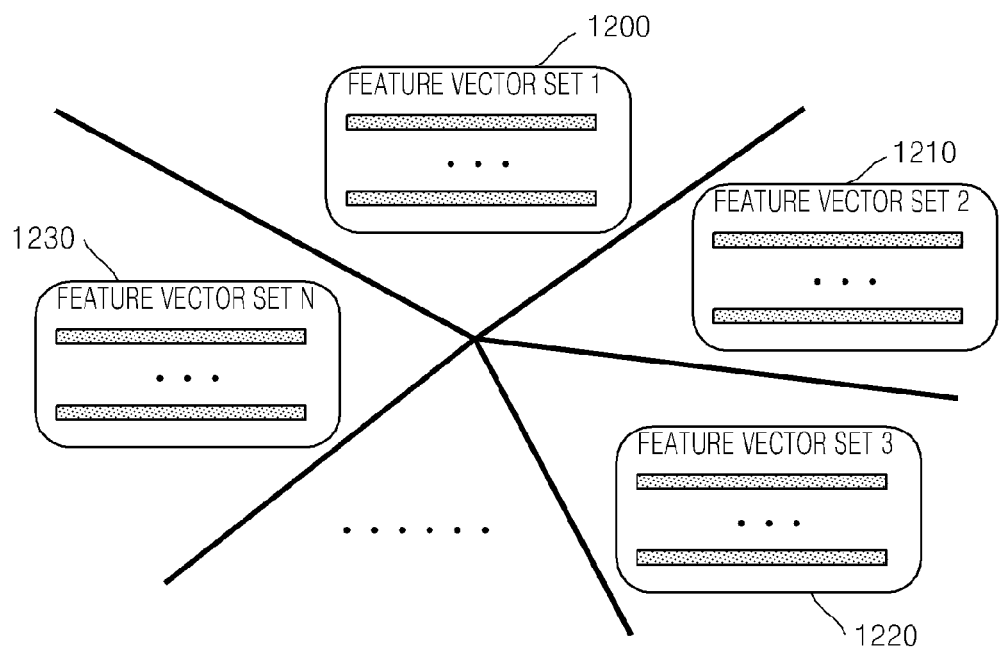
FIG. 12 illustrates an example of generating a classifier by using a feature vector set of each glass.

FIG. 12 illustrates an example of generating a classifier by using a feature vector set of each class. An optimal filter for each hole pixel of a low-resolution depth image is selected by using the method described with reference to FIG. 8 and a feature vector is stored with respect to a selected filter. When the above-described process is performed with respect to a color-depth image of a training database, a feature vector set is generated for each filter as illustrated in FIG. 12. Referring to FIG. 12, a feature vector set 1 is stored in a first filter 1200 and a feature vector set 2 is stored in a second filter 1210. Accordingly, feature vector sets 1 to N to all filters (first filter to N-th filter) are stored in the training database by being matched with each other.

A classifier to classify a variety of filters is designed by using a feature vector set.

A classifier capable of classifying a variety of filters by using a feature vector set is designed. To this end, a learning method such as a support vector machine, a neural network, adaptive boosting, etc. may be used. After machine learning is completed, only a classifier for each filter is stored.

The filter selection unit 650 selects a filter to upsample a low-resolution depth image according to the classification of the classification unit 640. As illustrated in FIG. 12, it is determined to which of the feature vector sets 1 through N a feature vector of a depth distribution of an input low-resolution depth image belongs, and it is determined to which of the first to N-th filters 1200 to 1230 a class to which the input feature vector belongs. For example, when a feature vector of the input low-resolution depth image belongs to the feature vector set 1, the first filter 1200 is selected as a filter to upsample the hole pixel. When a feature vector of the input low-resolution depth image belongs to the feature vector set 2, the second filter 1210 is selected as a filter to upsample the hole pixel. When the first filter 1200 is an average filter, a depth value of the hole pixel is generated by averaging the neighboring pixels of the hole pixel. When the second filter 1210 is the maximum value filter, a depth value having the maximum weight among the neighboring pixels with respect to the hole pixel is replaced with the depth value of the hole pixel.

The upsampling unit 660 upsamples the low-resolution depth image by using a filter selected by the filter selection unit 650. As illustrated in FIG. 12, the hole pixel is upsampled by using the filter selected among the first through N-th filters 1200 to 1230.

FIG. 13 is a flowchart for explaining a method of processing a depth image according to an embodiment of the present inventive concept. Referring to FIG. 13, in operation 1300, a high-resolution color image and a low-resolution depth image are input. The low-resolution depth image has a resolution lower than the high-resolution color image and may have a certain resolution ratio. In other words, the present inventive concept is not limited by a specific low resolution or high resolution.

In operation 1302, a feature vector may be generated based on a depth distribution of the low-resolution depth image. A hole pixel to be subject to upsampling or filtering is determined from the low-resolution depth image. A feature vector may be generated based on a distribution characteristic indicating weights of depth values of the neighboring pixels with respect to the hole pixel. The weight may be determined according to a distance between the hole pixel and the neighboring pixels or a color difference value between the hole pixel and the neighboring pixels, or both. In other words, it is determined that the weight increases as the distance decreases and the color difference value decreases. In a histogram of the weights of depth values of the neighboring pixels, a feature vector may be generated by using weights that are not 0 or a distance between bins whose weights are not 0, or by combining the weights and the distance. Also, a feature vector may be generated by transforming the feature vector generated by the above-described method into a frequency domain.

In operation 1304, a filter to upsample the low-resolution depth image may be selected by classifying the feature vector according to a previously learnt classifier. The classifier provides a feature vector set and a classification standard learning a filter optimized thereto by machine learning. Accordingly, a filter optimized to a feature vector of a particular hole pixel of the input low-resolution depth image may be selected according to the classification standard defined by the classifier.

In operation 1306, the low-resolution depth image may be upsampled by using the selected filter. In an embodiment of the present inventive concept, a filter optimized to a hole pixel is selected to filter the hole pixel and a high-resolution depth image is generated by repeating the operations 1300 to 1306 with respect to all hole pixels. Alternatively, a depth value of a hole pixel is calculated through the operations 1300 to 1306 and then a calculated hole pixel may be used as a known pixel, that is, a pixel having a depth value, for generation of a depth distribution of a next hole pixel and a feature vector.

In operation 1308, the upsampled high-resolution depth image may be output. In the method of processing a depth image according to the present embodiment, a filter is selectively applied according to a distribution characteristic of neighboring depth values with respect to a super resolution target pixel of a high-resolution. In doing so, an effective filtering method according to the depth value distribution is learnt from a ground-truth high-resolution depth image and a learning result is applied to an actual low-resolution depth image, thereby generating a high-resolution depth image.

FIG. 14 is a flowchart for explaining a method of processing a depth image according to another embodiment of the present inventive concept. Referring to FIG. 14, in operation 1400, a depth distribution histogram is input. The depth distribution histogram indicates weights assigned to depth values of the neighboring pixels with respect to a hole pixel in a low-resolution depth image. The weight increases as a distance between the hole pixel and the neighboring pixels decreases and as a difference in a color value between the hole pixel and the neighboring pixels decreases.

In operation 1402, a first feature vector is generated based on at least one of weights that are not 0 and a distance value between the weights that are not 0. In the present embodiment, although a filter to upsample the hole pixel of the low-resolution depth image may be selected by using the entire depth distribution histogram input in operation 1400, an upsampling filter is selected by extracting meaningful information, that is, a feature vector, in the entire depth distribution. The feature vector is generated by using the weight of a non-empty bin having a weight that is not 0 in the histogram. Alternatively, a distance value between the non-empty bins may be used therefore. Also, a feature vector may be generated by combining two feature vectors.

In operation 1404, it is determined whether the length of a feature vector is constant. Since the number of bins having weights in the hole pixel may vary, there is a need to maintain the length of a feature vector to be constant.

When it is determined in operation 1404 that the length of a feature vector is not constant, in operation 1406, a predetermined value is added to the first feature vector so that a second feature vector is generated. For example, when the length of a feature vector is fixed and a feature vector is generated to be shorter than the fixed length, a predetermined value is added to the feature vector, and thus, a feature vector having the fixed length may be generated. For example, a final element value of the feature vector generated in operation 1402 may be added. That is, in an embodiment, a predetermined value may be added to the first feature vector to generate a second feature vector that is normalized.

In operation 1404, when the length of a feature vector is constant, operation 1408 is performed. In operation 1408, a generated feature vector is transformed into a frequency domain. The feature vectors in a spatial area are discrete frequency transformed into the frequency domain. The transformation into the frequency domain may be performed by discrete cosine transform (DCT), discrete sine transform, discrete Fourier transform, etc., but the present inventive concept is not limited thereto.

In operation 1410, it is determined whether a predetermined value is added in operation 1406. When a predetermined value is added, in operation 1412, a DC component is removed from the feature vector that is transformed into the frequency domain. In operation 1406, since padding is performed to maintain the constant length of a feature vector in the spatial area, bias may exist in a low frequency component of a feature vector in the frequency domain. Accordingly, in operation 1412, a part of a low-frequency component (DC component) may be removed.

In operation 1414, a feature vector is generated.

Although the examples of generating a feature vector according to the present embodiments are described with reference to FIG. 14, the present inventive concept is not limited thereto and a variety of feature vectors expressing a depth distribution of a low-resolution depth image may be used therefore.

The apparatus described herein may comprise a processor, a memory for storing program data to be executed by the processor, a permanent storage such as a disk drive, a communications port for handling communications with external devices, and user interface devices, including a touch panel, keys, buttons, etc. When software modules are involved, these software modules may be stored as program instructions or computer readable code executable by the processor on a non-transitory computer-readable media such as read-only memory (ROM), random-access memory (RAM), CD-ROMs, magnetic tapes, floppy disks, and optical data storage devices. The computer readable recording media may also be distributed over network coupled computer systems so that the computer readable code is stored and executed in a distributed fashion. This media can be read by the computer, stored in the memory, and executed by the processor. Any one or more of the software modules described herein may alternatively be executed by a dedicated hardware-based computer or processor unique to that unit or by a hardware-based computer or processor common to one or more of the modules.

The described methods may be executed on a general purpose computer or processor or may be executed on a particular machine such as the encoding apparatus and decoding apparatus described herein. The methods according to the above-described example embodiments may also be recorded in non-transitory computer-readable media including program instructions to implement various operations embodied by a computer. Examples of program instructions include both machine code, such as produced by a compiler, and files containing higher level code that may be executed by the computer using an interpreter.

For the purposes of promoting the understanding of the principles of the present inventive concept, reference has been made to the embodiments illustrated in the drawings, and specific terminology has been used to describe these embodiments. However, no limitation of the scope of the inventive concept is intended by this specific terminology, and the present inventive concept should be construed to encompass all embodiments that would normally occur to one of ordinary skill in the art.

The present inventive concept may be described in terms of functional block components and various processing steps. Such functional blocks may be realized by any number of hardware and/or software components configured to perform the specified functions. For example, the present inventive concept may employ various integrated circuit components, e.g., memory elements, processing elements, logic elements, look-up tables, and the like, which may carry out a variety of functions under the control of one or more microprocessors or other control devices. Similarly, where the elements of the present inventive concept are implemented using software programming or software elements, the inventive concept may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the present inventive concept may employ any number of conventional techniques for electronics configuration, signal processing and/or control, data processing and the like. The words "mechanism" and "element" are used broadly and are not limited to mechanical or physical embodiments, but may include software routines in conjunction with processors, etc.

The particular implementations shown and described herein are illustrative examples of the present inventive concept and are not intended to otherwise limit the scope of the disclosure in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the present inventive concept unless the element is specifically described as "essential" or "critical". It will be recognized that the terms "comprising," "including," and "having," as used herein, are specifically intended to be read as open-ended terms of art.

Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the operations of all methods described herein can be performed in any suitable order unless otherwise indicated herein or otherwise clearly contradicted by context. The use of any and all examples, or exemplary language (e.g., "such as") provided herein, is intended merely to better illuminate the present inventive concept and does not pose a limitation on the scope of the present inventive concept unless otherwise claimed. Numerous modifications and adaptations will be readily apparent to those of ordinary skill in this art without departing from the spirit and scope of the present inventive concept.

As described above, according to the one or more of the above embodiments of the present inventive concept, an upsampling filter corresponding to a depth distribution characteristic of a low-resolution depth image is determined through a previously learning classifier and upsampling is performed by using a selected filter. Thus, a high-resolution depth image may be generated by using an optimized upsampling filter.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. A method of processing a depth image, the method comprising:
    receiving a high-resolution color image and a low-resolution depth image that corresponds to the high-resolution color image;
    generating a feature vector based on a depth distribution of the low-resolution depth image;
    selecting a filter to upsample the low-resolution depth image by classifying the generated feature vector according to a previously learnt classifier;
    upsampling the low-resolution depth image by using the selected filter; and
    outputting an upsampled high-resolution depth image.

2. The method of claim 1, further comprising:
    determining a hole pixel that is an upsampling target pixel in the low-resolution depth image by using the high-resolution color image; and
    determining the depth distribution based on depth values and weights of neighboring pixels of the determined hole pixel.

3. The method of claim 2, wherein the weights are set to increase as a distance between the determined hole pixel and the neighboring pixels decreases and as a difference in a color value between the determined hole pixel and the neighboring pixels decreases.

4. The method of claim 1, wherein the feature vector is generated based on a change pattern of the depth distribution.

5. The method of claim 1, wherein the feature vector is generated based on weights that are higher than a first critical value in a histogram of weights of depth values indicating the depth distribution.

6. The method of claim 1, wherein the feature vector is generated based on distance values between weights that are higher than a second critical value in a histogram of weights of depth values indicating the depth distribution.

7. The method of claim 1, wherein the feature vector is generated based on at least one of weights that are higher than a first critical value and distance values between weights that are over a second critical value in a histogram of weights of depth values indicating the depth distribution, and a predetermined value added to maintain a fixed length of the feature vector.

8. The method of claim 1, wherein the generating of the feature vector comprises:
    generating a first feature vector based on at least one of weights that are higher than a first critical value and distance values between weights that are over a second critical value in a histogram of weights of depth values indicating the depth distribution;
    generating a second feature vector by adding a predetermined value to the first feature vector to maintain a fixed length of the feature vector;
    performing a discrete frequency transformation on a generated second feature vector into a frequency domain; and
    removing at least one of a DC component of the second feature vector that is discrete frequency transformed and an AC component that is smaller than a third critical value.

9. The method of claim 1, wherein the classifier performs machine learning based on the high-resolution color image and a sampled high-resolution depth image corresponding to the high-resolution color image.

10. The method of claim 9, wherein the classifier comprises a feature vector set that is learnt based on a result of sampling by using a plurality of filters with respect to a low-resolution depth image that is obtained by reducing the sampled high-resolution depth image.

11. The method of claim 1, further comprising matching capturing time points of the high-resolution color image and the low-resolution depth image.

12. The method of claim 2, further comprising normalizing the weights.

13. The method of claim 2, wherein the upsampling comprises upsampling a plurality of determined hole pixels and the outputting comprises outputting the high-resolution depth image after the upsampling is performed on all of the plurality of determined hole pixels.

14. The method of claim 13, wherein the upsampling is performed consecutively on each of the plurality of determined hole pixels.

15. An apparatus for processing a depth image, the apparatus comprising:
    a hardware-based processor to execute one or more processor-executable units;
    a feature vector generation unit for receiving a high-resolution color image and a low-resolution depth image that corresponds to the high-resolution color image and generating a feature vector based on a depth distribution of the low-resolution depth image;
    a classification unit for classifying the generated feature vector according to a previously learnt classifier;
    a filter selection unit for selecting a filter to upsample the low-resolution depth image; and
    an upsampling unit for upsampling the low-resolution depth image by using the selected filter and outputting an upsampled high-resolution depth image.

16. The apparatus of claim 15, further comprising:
    a hole pixel determination unit for determining a hole pixel that is an upsampling target pixel in the low-resolution depth image by using the high resolution color image; and
    a depth distribution determination unit for determining the depth distribution based on depth values and weights of neighboring pixels of the determined hole pixel.

17. The apparatus of claim 16, wherein the weights are set to increase as a distance between the determined hole pixel and the neighboring pixels decreases and as a difference in a color value between the determined hole pixel and the neighboring pixels decreases.

18. The apparatus of claim 15, wherein the feature vector is generated based on a change pattern of the depth distribution.

19. The apparatus of claim 15, wherein the feature vector is generated based on weights that are higher than a first critical value in a histogram of weights of depth values indicating the depth distribution.

20. The apparatus of claim 15, wherein the feature vector is generated based on distance values between weights that are higher than a second critical value in a histogram of weights of depth values indicating the depth distribution.

21. The apparatus of claim 15, wherein the feature vector is generated based on at least one of weights that are higher than a first critical value and distance values between weights that are higher than a second critical value in a histogram of weights of depth values indicating the depth distribution, and a predetermined value added to maintain a fixed length of the feature vector.

22. The apparatus of claim 15, wherein the feature vector generation unit generates a first feature vector based on at least one of weights that are higher than a first critical value and distance values between weights that are higher than a second critical value in a histogram of weights of depth values indicating the depth distribution, generates a second feature vector by adding a predetermined value to the first feature vector to maintain a fixed length of the feature vector, discrete frequency transforms a generated second feature vector into a frequency domain, and removes at least one of a DC component of the second feature vector that is discrete frequency transformed and an AC component that is smaller than a third critical value.

23. The apparatus of claim 15, wherein the classifier performs machine learning based on the high-resolution color image and a sampled high-resolution depth image corresponding to the high-resolution color image.

24. The apparatus of claim 15, wherein the classifier comprises a feature vector set that is learnt based on a result of sampling by using a plurality of filters with respect to a low-resolution depth image that is obtained by reducing the upsampled high-resolution depth image.

25. The apparatus of claim 15, wherein the apparatus is provided within at least one of a 3D camera, a 3D television, a 3D monitor, and a 3D cinema system.

26. A non-transitory computer readable recording medium having recorded thereon a program for executing the method defined in claim 1.

27. A method of processing a depth image, the method comprising:
receiving a high-resolution color image and a low-resolution depth image that corresponds to the high-resolution color image;
adaptively selecting a filter to upsample the low-resolution depth image from a plurality of filters based on a depth distribution of the low-resolution depth image; and
upsampling, by way of a processor, the low-resolution depth image using the selected filter.

28. The method of claim 27, further comprising:
using the high-resolution color image to determine a hole pixel that is a target pixel to be upsampled in the low-resolution depth image; and
determining the depth distribution based on weighted depth values of neighboring pixels of the determined hole pixel.

29. An apparatus for processing a depth image, the apparatus comprising:
a hardware-based processor to execute one or more processor-executable units;
a depth distribution determination unit to receive a high-resolution color image and a low-resolution depth image that corresponds to the high-resolution color image and to generate a depth distribution of each portion of a plurality of portions of the low-resolution depth image; and
a filter selection unit to adaptively select a different filter to upsample each portion of the low-resolution depth image from a plurality of filters based on the depth distribution of each portion of the plurality of portions of the low-resolution depth image determined by the depth distribution determination unit.

* * * * *